(12) United States Patent
Fattaahi

(10) Patent No.: US 8,060,124 B1
(45) Date of Patent: Nov. 15, 2011

(54) METHODS AND SYSTEMS FOR INITIATING FORWARDING OF SMS MESSAGES

(75) Inventor: Shahraam Fattaahi, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 866 days.

(21) Appl. No.: 11/970,678

(22) Filed: Jan. 8, 2008

(51) Int. Cl.
*H04W 4/00* (2009.01)
*H04W 3/42* (2006.01)
(52) U.S. Cl. ..................... 455/466; 455/414.1
(58) Field of Classification Search ............ 455/88, 455/130, 344, 39, 68, 73, 12.1, 3.2, 551, 455/522.1, 432.1, 414.1, 466, 404.1, 41.2, 455/455, 410, 436, 437, 412.1, 556.2; 370/338, 370/331, 352
See application file for complete search history.

(56) References Cited

U.S. PATENT DOCUMENTS

| 7,020,478 | B1 * | 3/2006 | Collette | 455/466 |
| 2006/0234760 | A1 * | 10/2006 | Cheng | 455/551 |
| 2007/0032225 | A1 * | 2/2007 | Konicek et al. | 455/417 |
| 2007/0032226 | A1 * | 2/2007 | Link et al. | 455/417 |
| 2008/0200192 | A1 * | 8/2008 | Harris | 455/466 |
| 2009/0111392 | A1 * | 4/2009 | Taylor | 455/88 |

\* cited by examiner

*Primary Examiner* — Melody Mehrpour

(57) ABSTRACT

Methods and systems are provided for initiating an SMS-message-forwarding function on a mobile device. In one embodiment, the mobile device detects a first command to direct a wireless-service-provider network to initiate a call-forwarding function for the mobile device. Responsive to detecting the first command, the mobile device initiates an SMS-message-forwarding function on the mobile device.

20 Claims, 2 Drawing Sheets

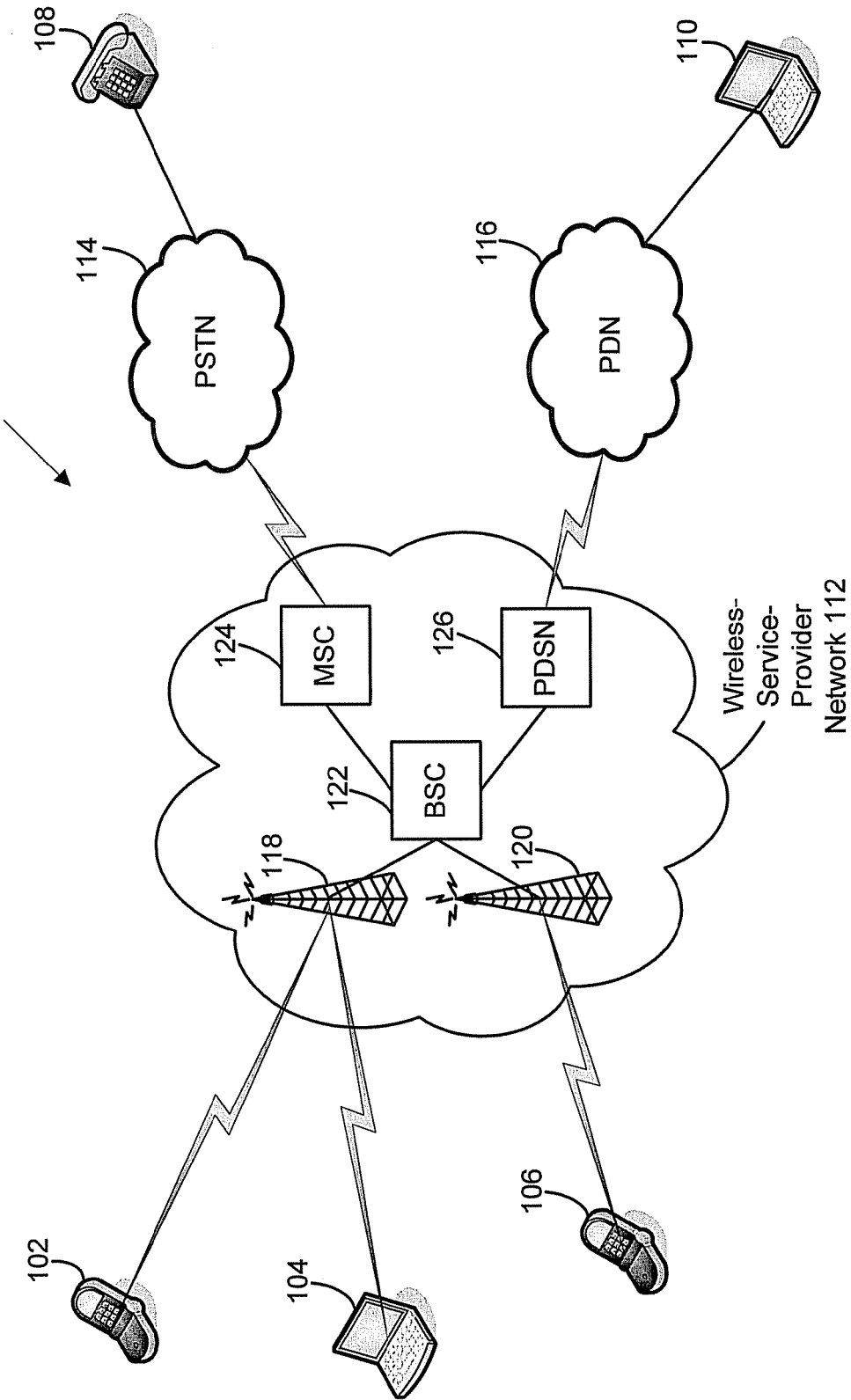

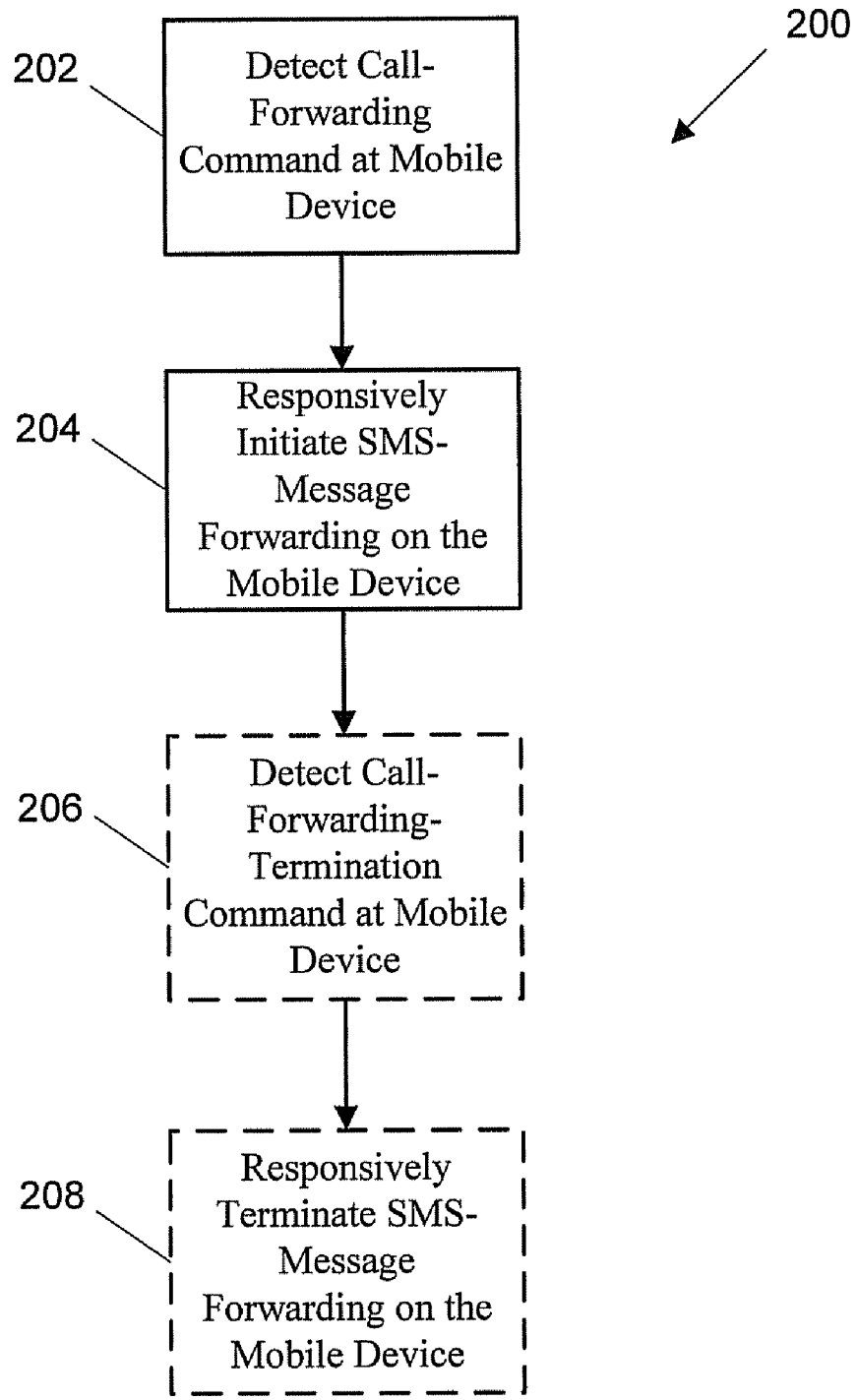

METHODS AND SYSTEMS FOR INITIATING FORWARDING OF SMS MESSAGES

FIELD OF THE INVENTION

The present invention relates to wireless communications and, more particularly, to initiating mobile-device functions.

BACKGROUND

As the use of mobile devices increases, forwarding services related to mobile-device use have become more widespread. As examples, call forwarding and Short Message Service (SMS)-message forwarding have become increasingly popular.

Call forwarding is a feature that allows incoming calls to a user's mobile device to be redirected (or forwarded) to an alternate mobile device or to a landline device, as examples. Typically, a user uses call forwarding for a mobile device when the user cannot—or does not want to—be reached at the user's mobile device, but can be—or prefers to be—reached at an alternate mobile device or at a landline device. In some implementations, the user's mobile device will ring once to remind the user that an incoming call is being forwarded to an alternate mobile device or to a landline device. In other implementations, the user's mobile device will give no indication of a call being forwarded.

Similar to call forwarding, SMS-message forwarding is a feature that allows incoming SMS messages sent to a user's mobile device to be redirected to an alternate mobile device or to an e-mail address, as examples. A user of a mobile device may use this feature when the user needs to or prefers to receive incoming messages at an alternate device or e-mail address, as examples. Note that the SMS-message-forwarding function may be implemented on the network side or by the user's mobile device. That is, in some implementations, once SMS forwarding has been activated, messages addressed to the user's mobile device may be delivered to the forwarding device or address without ever reaching the user's mobile device. In other implementations, however, the user's mobile device may receive the messages, and then forward them on to the forwarding device or address.

SUMMARY

Methods and systems are provided for initiating an SMS-message-forwarding function on a mobile device. In one embodiment, the invention could take the form of a method. In accordance with the method, the mobile device detects a first command to direct the wireless-service-provider network to initiate a call-forwarding function for the mobile device. Responsive to detecting the first command, the mobile device initiates an SMS-message-forwarding function on the mobile device.

In one embodiment, detecting the first command includes detecting at least one dialed character on the mobile device. In another embodiment, detecting the first command includes detecting a voice command. In yet another embodiment, detecting the first command includes detecting execution of at least one preprogrammed instruction.

In some embodiments, initiating the SMS-message-forwarding function includes automatically initiating the SMS-message-forwarding function. In other embodiments, initiating the SMS-message-forwarding function includes prompting a user of the mobile device to initiate the SMS-message-forwarding function, and receiving a user confirmation to authorize initiation of the SMS-message-forwarding function.

Further in accordance with the method, the mobile device may detect a second command to direct the wireless-service-provider network to terminate the call-forwarding function for the mobile device. Responsive to detecting the second command, the mobile device terminates the SMS-message-forwarding function on the mobile device.

These as well as other aspects and advantages will become apparent to those of ordinary skill in the art by reading the following detailed description, with appropriate reference to the accompanying drawings.

BRIEF DESCRIPTION OF THE DRAWINGS

Various exemplary embodiments are described herein with reference to the following drawings, wherein like numerals denote like entities.

FIG. 1 is a block diagram depicting a communication system, in accordance with exemplary embodiments; and FIG. 2 is a flow chart of a method, in accordance with exemplary embodiments.

DETAILED DESCRIPTION

1. Overview

When a user of a mobile device wishes to initiate call forwarding for the mobile device, the user may also wish to initiate SMS-message forwarding on the mobile device. In such a circumstance, it may be inconvenient for the user to have to manually initiate both the SMS-message-forwarding function and the call-forwarding function. In accordance with the present invention, the mobile device detects a first command to direct the wireless-service-provider network to initiate a call-forwarding function for the mobile device. Responsive to detecting the first command, the mobile device initiates an SMS-message-forwarding function on the mobile device. Because the mobile device initiates the SMS-message-forwarding function, the user is saved the effort of doing so.

Further, since the mobile device initiates (and operates) the SMS-message-forwarding function, changes or updates to functionality on the network side should not be required. As an example, the wireless-service-provider network would not be required to store and update look-up tables that include (1) mobile devices that have initiated (or requested to initiate) the SMS-message-forwarding function and (2) corresponding forwarding devices or addresses. Rather than requiring changes or updates to functionality on the network side, the wireless-service-provider network may simply see additional SMS messages that are forwarded from one mobile device to another forwarding device or address.

2. Exemplary Architecture

FIG. 1 is a block diagram depicting a communication system 100, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes mobile devices 102, 104, 106, and 110, landline device 108, a wireless-service-provider network 112, a public switched telephone network (PSTN) 114, and a packet-data network (PDN) 116. The wireless-service-provider network 112 includes base transceiver stations (BTSs) 118 and 120, a base station controller (BSC) 122, a mobile switching center (MSC) 124, and a packet data serving node (PDSN) 126.

Additional entities could be present, such as additional mobile devices in communication with BTSs 118 and 120, additional BTSs in communication with BSC 122, and additional BSCs in communication with MSC 124 and/or PDSN 126. Furthermore, there could be additional devices in communication with PSTN 114 and/or PDN 116. Also, there could be one or more devices and/or networks making up at least part of one or more of the communication links. For example, there could be one or more routers, switches, or other devices or networks on the link between PDSN 126 and PDN 116. Further, PSTN 114 and PDN 116 may be connected via one or more gateways and/or other devices. Other variations and/or additions are possible as well.

Each of the mobile devices 102, 104, 106, and 110 may be any device arranged to carry out the mobile-device functions described herein. As such, each of the mobile devices 102, 104, 106, and 110 may include a user interface, a wireless-communication interface, a processor, and data storage comprising instructions executable by the processor for carrying out those mobile-device functions. The user interface may include a keypad, a touch-screen, a microphone, and/or any other elements for receiving inputs, as well as a speaker, one or more displays, and/or any other elements for communicating outputs.

The wireless-communication interface may comprise an antenna and a chipset for communicating with one or more BTSs over an air interface. As an example, the chipset could be one that is suitable for CDMA communication. The chipset or wireless-communication interface in general may also be able to communicate with other types of networks and devices, such as IS-856 Evolution Data Optimized (EV-DO) networks, Wi-Fi (IEEE 802.11) networks, Bluetooth devices, and/or one or more additional types of wireless networks and devices.

The processor and data storage may be any suitable components known to those of skill in the art. As examples, each of the mobile devices 102, 104, 106, and 110 could be or include a mobile phone, a PDA, a computer, a laptop computer, a hybrid CDMA/EV-DO device, and/or a multi-mode cellular/Wi-Fi device.

Note that any combination of BTS 118, BTS 120, and BSC 122 may be considered—and referred to herein as—a base station. However, any one of BTS 118, BTS 120, and BSC 122 could, taken alone, be considered a base station as, well. Further the base station may make use of one or more functions provided by MSC 124, PDSN 126, and/or any other entity, without departing from the scope or spirit of the present invention.

Each of the BTSs 118 and 120 may be any network element arranged to carry out the BTS functions described herein. As such, each of the BTSs 118 and 120 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile devices over an air interface. The communication interface may also include one or more wired and/or wireless interfaces for communicating with at least BSC 122. As an example, a wired Ethernet interface may be included.

BSC 122 may be any network element arranged to carry out the BSC functions described herein. As such, BSC 122 may include a communication interface, a processor, and data storage comprising instructions executable by the processor to carry out those BSC functions. The communication interface may include one or more wired and/or wireless interfaces for communicating with at least BTSs 118 and 120, MSC 124, and PDSN 126. In general, BSC 122 functions to control one or more BTSs, such as BTSs 118 and 120, and to provide one or more BTSs, such as BTSs 118 and 120, with connections to devices such as MSC 124 and PDSN 126.

MSC 124 may be any networking element arranged to carry out the MSC functions described herein. As such, MSC 124 may include a communication interface, a processor, and data storage comprising instructions executable by the processor to carry out those MSC functions. The communication interface may include one or more wired and/or wireless interfaces for communicating with at least BSC 122 and PSTN 114. In general, MSC 124 functions as a switching element between PSTN 114 and one or more BSCs such as BSC 122, facilitating communication between mobile devices and PSTN 114, which may be the well-known public switched telephone network.

PDSN 126 may be any networking element arranged to carry out the PDSN functions described herein. As such, PDSN 126 may include a communication interface, a processor, and data storage comprising instructions executable by the processor for carrying out those PDSN functions. The communication interface may include one or more wired and/or wireless interfaces for communicating with at least BSC 122 and PDN 116. In general, PDSN 126 functions as a network access server between PDN 116 and BSCs such as BSC 122, facilitating packet-data communication between mobile devices and PDN 116.

PDN 116 may include one or more wide area networks, one or more local area networks, one or more public networks such as the Internet, one or more private networks, one or more wired networks, one or more wireless networks, and/or one or more networks of any other type. Devices in communication with PDN 116 may exchange data using a packet-switched protocol such as the Internet Protocol (IP), and may be identified by an address such as an IP address.

3. Exemplary Operation

A. Introduction

FIG. 2 depicts a flow chart 200 of a method, in accordance with exemplary embodiments. As shown in FIG. 2, the method 200 begins at block 202, when the mobile device 102 detects a first command to direct the wireless-service-provider network 112 to initiate a call-forwarding function for the mobile device 102. At block 204, responsive to detecting the first command, the mobile device 102 initiates an SMS-message-forwarding function on the mobile device 102.

In some embodiments, at block 206, the mobile device 102 may detect a second command to direct the wireless-service-provider network 112 to terminate the call-forwarding function for the mobile device 102. At block 208, responsive to detecting the second command, the mobile device 102 terminates the SMS-message-forwarding function on the mobile device 102. The illustrated functions are further explained in the following section.

B. Method Steps i. Detecting a First Command

At block 202, the mobile device 102 detects a first command to direct the wireless-service-provider network 112 to initiate a call-forwarding function for the mobile device 102. Detecting the first command may take any of a variety of foul's. In some embodiments, the mobile device 102 may include a touch-screen and/or keypad for use in detecting the first command. As such, detecting the first command may include detecting at least one dialed character (number, symbol, letter, etc.) on the mobile device 102. To illustrate, detecting the first command may include detecting "*72," or any other combination of numbers, symbols, and/or letters, dialed on the keypad or touch-screen. The command may be followed by an alternate mobile-device number or landline-device number to which incoming calls will be forwarded; alternatively, the mobile device 102 may store a default forwarding number.

As another example, detecting the first command may include detecting a voice command. For instance, a user may vocalize the phrase, "forward calls," or any other voice command, and perhaps then vocalize or dial an alternate mobile-device number or landline-device number to which incoming calls will be forwarded.

As yet another example, detecting the first command may include detecting execution of at least one preprogrammed instruction. For instance, a user may preprogram the mobile device 102 to direct the wireless-service-provider network 112 to initiate the call-forwarding function for the mobile device 102 every Saturday and Sunday. Detecting the first command may include detecting execution of the preprogrammed instruction on a given Saturday or Sunday. Of course, other examples of detecting the first command also exist.

The call-forwarding function may forward calls in any of a variety of ways. For instance, the call-forwarding function may forward calls unconditionally, after a predetermined number of rings, in response to the mobile device 102 being busy, only during one or more selected periods of time, or in some other manner. Additionally, two or more of the above ways to forward calls may be used in any combination. For example, the call-forwarding function may forward calls in the evenings and only after a predetermined number of rings. Other implementations are also possible.

Additionally, incoming calls may be forwarded to any of a variety of devices. As examples, the call-forwarding function may forward incoming calls to an alternate mobile device (e.g., any of mobile devices 104, 106, and 110), or to a landline device (e.g., landline device 108).

ii. Initiating an SMS-Message-Forwarding Function

Next, at block 204, responsive to detecting the first command, the mobile device 102 initiates an SMS-message-forwarding function on the mobile device 102. The mobile device 102 then operates the SMS-message-forwarding function. In an embodiment, the mobile device 102 receives an SMS message from the mobile device 104 (or any other device or entity operable to send SMS messages), and then forwards the SMS message to the mobile device 110 (or any other device, entity, or address operable to receive SMS messages). Since the mobile device 102, rather than the wireless-service-provider network 112, operates the SMS-message-forwarding function, changes or updates to functionality on the network side should not be required.

Initiating the SMS-message-forwarding function may take any of a variety of forms. For instance, the mobile device 102 may automatically initiate the SMS-message-forwarding function in response to detecting the first command in block 202. As another example, the mobile device 102 may prompt a user to initiate the SMS-message-forwarding function, and receive a user confirmation to authorize initiation of the SMS-message-forwarding function. If the user authorizes the SMS-message-forwarding function, then the mobile device 102 initiates SMS-message forwarding. On the other hand, if the user declines authorization, then the mobile device 102 will not initiate SMS-message forwarding. Of course, other examples of initiating the SMS-message-forwarding function on the mobile device 102 also exist.

Further, the SMS-message-forwarding function is operable to forward any of a variety of message types, in addition to standard SMS (i.e., text) messages. As an example, the SMS-message-forwarding function may forward concatenated SMS messages (also known as long SMS messages). A concatenated SMS message typically supports more characters than an SMS message (e.g., more than 160 characters). In operation, concatenated SMS messages are broken down by the sending mobile device into smaller messages, and the sending mobile device sends each of the smaller messages as individual SMS messages. When each of the individual SMS messages reaches the destination, the recipient mobile device, for instance, will combine each of the received individual SMS messages into the original message.

As yet another example, the SMS-message-forwarding function may forward Enhanced Messaging Service (EMS) messages. EMS can support media-rich content (e.g., ringtones, pictures, operator logos, wallpapers, animations, and business cards such as VCards). Further, EMS allows for the text of an EMS message to be formatted (e.g., bold, italic, large font, small font). The SMS-message-forwarding function may forward other types of messages (e.g., Multimedia Messaging Service (MMS) messages), and any combination of message types as well.

Additionally, the SMS-message-forwarding function may utilize any one of a variety of protocols. Examples of such protocols include short message peer-to-peer (SMPP), external machine interface/universal computer (EMI/UCP), computer interface to message distribution (CIMD), open interface specification (OIS), Bluetooth, and Global System for Mobile Communications (GSM). The SMS-message-forwarding function may utilize other protocols, and any combination of protocols as well.

Further, the SMS-message-forwarding function may forward received messages to any of a variety of devices and/or addresses. As examples, received message may be forwarded to a mobile-device number and/or an e-mail address. Other examples of devices and/or addresses also exist.

iii. Detecting a Second Command

In some embodiments, at block 206, the mobile device 102 may detect a second command to direct the wireless-service-provider network 112 to terminate the call-forwarding function for the mobile device 102. Detecting the second command may be substantially similar to detecting the first command from block 202, or may take another form.

iv. Terminating the SMS-Message-Forwarding Function

Next, at block 208, responsive to detecting the second command, the mobile device 102 terminates the SMS-message-forwarding function on the mobile device 102. Terminating the SMS-message-forwarding function may take any of a variety of forms. For instance, the mobile device 102 may automatically terminate the SMS-message-forwarding function in response to detecting the second command in block 206. As another example, the mobile device 102 may prompt a user to terminate the SMS-message-forwarding function, and receive a user confirmation to terminate the SMS-message-forwarding function. Of course, other examples of terminating the SMS-message-forwarding function on the mobile device 102 also exist. Further, as an example, upon terminating the SMS-message-forwarding function, when the mobile device 102 receives an SMS message from the mobile device 104, it will not forward the SMS message to another device and/or address.

4. Conclusion

As set forth above, methods and systems are provided for initiating an SMS-message-forwarding function on a mobile device. Because the mobile device initiates the SMS-message-forwarding function, the user is saved the effort doing so. Further, since the mobile device initiates and operates the SMS-message-forwarding function on the mobile device, changes or updates to functionality on the network side should not be required.

Various exemplary embodiments have been described above. Those skilled in the art will understand, however, that changes and modifications may be made to those examples without departing from the scope of the claims.

I claim:

1. In a communication system comprising a wireless-service-provider network and a mobile device, a method comprising:
   at the mobile device, detecting a first command to direct the wireless-service-provider network to initiate a call-forwarding function for the mobile device; and
   responsive to detecting the first command, the mobile device initiating a Short Message Service (SMS)-message-forwarding function on the mobile device itself, without directing the wireless-service-provider network to initiate the SMS-message-forwarding function.

2. The method of claim 1, wherein detecting the first command comprises detecting at least one dialed character on the mobile device.

3. The method of claim 2, wherein the at least one dialed character comprises at least one of (i) at least one number, (ii) at least one symbol, and (iii) at least one letter.

4. The method of claim 1, wherein the mobile device comprises at least one of a touch-screen and a keypad for use in detecting the first command.

5. The method of claim 1, wherein detecting the first command comprises detecting a voice command.

6. The method of claim 1, wherein detecting the first command comprises detecting execution of at least one preprogrammed instruction.

7. The method of claim 1, wherein the wireless-service-provider network comprises a mobile switching center (MSC), and wherein detecting the first command comprises detecting a command to direct the MSC to initiate the call-forwarding function for the mobile device.

8. The method of claim 1, wherein the wireless-service-provider network comprises a base station, and wherein detecting the first command comprises detecting a command to direct the base station to initiate the call-forwarding function for the mobile device.

9. The method of claim 1, wherein initiating the SMS-message-forwarding function comprises automatically initiating the SMS-message-forwarding function.

10. The method of claim 1, wherein initiating the SMS-message-forwarding function comprises:
    prompting a user of the mobile device to initiate the SMS-message-forwarding function; and
    receiving a user confirmation to authorize initiation of the SMS-message-forwarding function.

11. The method of claim 1, wherein the SMS-message-forwarding function is operable to forward at least one of the following types of messages: SMS messages, concatenated SMS messages, Enhanced Messaging Service (EMS) messages, and Multimedia Messaging Service (MMS) messages.

12. The method of claim 1, wherein the SMS-message-forwarding function utilizes at least one of the following protocols: short message peer-to-peer (SMPP), external machine interface/universal computer (EMI/UCP), computer interface to message distribution (CIMD), open interface specification (OIS), Bluetooth, and Global System for Mobile Communications (GSM).

13. The method of claim 1, wherein the SMS-message-forwarding function is operable to forward a received message to at least one of a mobile-device number and an e-mail address.

14. The method of claim 1, further comprising:
    at the mobile device, detecting a second command to direct the wireless-service-provider network to terminate the call-forwarding function for the mobile device; and
    responsive to detecting the second command, terminating the SMS-message-forwarding function on the mobile device.

15. A mobile device comprising:
    a communication interface;
    a processor; and
    data storage comprising instructions executable by the processor to:
        detect a first command to direct a wireless-service-provider network to initiate a call-forwarding function for the mobile device; and
        responsive to detecting the first command, initiate a Short Message Service (SMS)-message-forwarding function on the mobile device itself, without directing the wireless-service-provider network to initiate the SMS-message-forwarding function.

16. The mobile device of claim 15, wherein the instructions to initiate the SMS-message-forwarding function comprise instructions to automatically initiate the SMS-message-forwarding function.

17. The mobile device of claim 15, wherein the instructions to initiate the SMS-message-forwarding function comprise instructions to:
    prompt a user of the mobile device to initiate the SMS-message-forwarding function; and
    receive a user confirmation to authorize initiation of the SMS-message-forwarding function.

18. The mobile device of claim 15, wherein the SMS-message-forwarding function is operable to forward a received message to at least one of a mobile-device number and an e-mail address.

19. The mobile device of claim 15, wherein the data storage further comprises instructions to:
    detect a second command to direct the wireless-service-provider network to terminate the call-forwarding function for the mobile device; and
    responsive to detecting the second command, terminate the SMS-message-forwarding function on the mobile device.

20. In a communication system comprising a wireless-service-provider network and a mobile device, a method comprising:

at the mobile device, detecting a first command to direct the wireless-service-provider network to initiate a call-forwarding function for the mobile device;

responsive to detecting the first command, the mobile device initiating a Short Message Service (SMS)-message-forwarding function on the mobile device itself, without directing the wireless-service-provider network to initiate the SMS-message-forwarding function;

at the mobile device, detecting a second command to direct the wireless-service-provider network to terminate the call-forwarding function for the mobile device; and responsive to detecting the second command, terminating the SMS-message-forwarding function on the mobile device.

* * * * *